United States Patent [19]

Richter et al.

[11] Patent Number: 5,045,226

[45] Date of Patent: Sep. 3, 1991

[54] POLYISOCYANATE PREPARATIONS CONTAINING LATENT TIN CATALYSTS AND A PROCESS FOR THEIR PREPARATION

[75] Inventors: Roland Richter, Cologne; Hanns P. Müller, Odenthal; Wilhelm Weber, Cologne; Rudolf Hombach, Leverkusen; Bernd Riberi; Ralf Busch, both of Cologne; Hans-Gerd Metzinger, Leverkusen, all of Fed. Rep. of Germany

[73] Assignee: Bayer Aktiengesellschaft, Bayerwerk, Fed. Rep. of Germany

[21] Appl. No.: 558,123

[22] Filed: Jul. 24, 1990

Related U.S. Application Data

[63] Continuation of Ser. No. 947,014, Dec. 29, 1986, abandoned.

[30] Foreign Application Priority Data

Jan. 4, 1986 [DE] Fed. Rep. of Germany ....... 3600093

[51] Int. Cl.$^5$ ......................... B01J 31/00; C09K 3/00; C08G 18/08
[52] U.S. Cl. ............................ 252/182.2; 252/182.21; 502/167; 502/158; 528/52; 528/58
[58] Field of Search ....................... 252/182.2, 182.21; 502/167, 158; 528/52, 58

[56] References Cited

U.S. PATENT DOCUMENTS

| | | | |
|---|---|---|---|
| 3,945,981 | 3/1976 | Robertson | 528/58 |
| 3,980,579 | 9/1976 | Syrop et al. | 252/182 |
| 4,192,938 | 3/1980 | Dieterich | 252/182 |
| 4,194,035 | 3/1980 | Dieterich | 252/182 |
| 4,607,062 | 8/1986 | Megna | 252/182 |
| 4,644,016 | 2/1987 | Rasshofer et al. | 521/128 |
| 4,824,595 | 4/1989 | Richter et al. | 252/182.17 |

FOREIGN PATENT DOCUMENTS

| | | |
|---|---|---|
| 132675 | 7/1984 | European Pat. Off. . |
| 957585 | 5/1964 | United Kingdom . |
| 1254690 | 11/1971 | United Kingdom . |

OTHER PUBLICATIONS

A. Karkas and G. A. Mills, "Advanced Catalysis 13", pp. 393, 1962.

J. H. Saunders, K. C. Frisch, "Polyurethanes", Part 1, Wiley Interscience, N.Y. N.Y. Chapter VI, 1962.

K. C. Frisch and L. P. Rumao, J. Macromol, Sci-Revs, Macromol Chem., C5, pp. 103–150 (1970).

*Primary Examiner*—Morton Foelak
*Assistant Examiner*—Dennis R. Daley
*Attorney, Agent, or Firm*—Joseph C. Gil; Richard E. L. Henderson

[57] ABSTRACT

Polyisocyanate preparations containing latent tin catalysts are made from an organic polyisocyanate and a reaction product of a sulfonyl isocyanate and an organic tin catalyst in which at least one tin-oxygen bond is present. The organic tin catalyst preferably contains a tin-alkoxy, tin-siloxy, distannoxane and/or tin-carboxylate group. The reaction product of a sulfonyl isocyanate with a tin-carboxylate must generate carbon dioxide during its formation. The sulfonyl isocyanate and organic tin compound are used in quantities such that at least one isocyanato-sulfonyl group is present for each tin-oxygen bond. These polyisocyanate preparation are storage stable and may be used to produce adhesives, coatings and foams.

17 Claims, No Drawings

POLYISOCYANATE PREPARATIONS CONTAINING LATENT TIN CATALYSTS AND A PROCESS FOR THEIR PREPARATION

This application is a continuation of application Ser. No. 06/947,014 filed Dec. 29, 1986 now abandoned.

BACKGROUND OF THE INVENTION

This invention relates to new polyisocyanate preparations containing latent tin catalysts, a process for preparing these new polyisocyanate preparations and a process for the production of polyurethane plastics from these polyisocyanate preparations.

The catalysis of isocyanate addition reactions plays an important part in technical polyurethane chemistry such as the production of polyurethane foams, elastomers, lacquers and adhesives.

Tertiary amines and especially organic tin compounds are catalysts used for this purpose. These compounds catalyze urethanization (reaction of isocyanate groups with alcoholic hydroxyl groups) and urea formation (reaction of isocyanate groups with water) as well as the trimerization of isocyanate groups, addition of isocyanate groups to urethane groups (allophanatization) and addition of isocyanate groups to urea groups (biuretization).

Organic tin compounds are particularly valuable catalysts used in both one component and two component polyurethane systems. A survey of the catalysts commonly used and the mechanism of their action may be found in A. Farkas and G. A. Mills, Advan. Catalysis, 13, 393 (1962), J. H. Saunders and K. C. Frisch, Polyurethanes, Part I, Wiley Interscience, New York, 1962, Chapter VI, and K. C. Frisch and L. P. Rumao, J. Macromol, Sci. Revs. Macromol Chem., C5(1), 103–150 (1970).

However, catalytically active tin compounds, in particular tin carboxylates and tin alkoxides have two serious disadvantages.

First, these active tin compounds are sensitive to hydrolysis. Therefore, they cannot readily be incorporated in the usual polyol formulations, which generally contain traces of moisture because they would gradually lose some of their catalytic activity when stored in the polyol formulations.

The second disadvantage of these active tin compounds is that when they are used for organic polyisocyanates (i.e. the polyisocyanate component of 2-component systems or isocyanate prepolymers of the kind used as binders in one component systems such as moisture drying coating compounds), they should be incorporated only shortly before the systems are applied because their presence would seriously impair the storage stability of the polyisocyanates due to the above-mentioned side reactions which are catalyzed by tin compounds.

SUMMARY OF THE INVENTION

It is therefore an object of the present invention to modify organic tin compounds which accelerate the addition reaction of isocyanate groups to make them inactive. These catalysts in inactive form may be dissolved in polyisocyanates (in particular in isocyanate prepolymers) without affecting the storage stability of these polyisocyanates. These inactive catalysts may, however, be spontaneously activated when put to use.

This object is accomplished by reacting a sulfonyl isocyanate with organic tin catalysts of a specified type in a specified manner. This reaction product may then be added to a polyisocyanate.

DETAILED DESCRIPTION OF THE INVENTION

The present invention relates to polyisocyanate preparations made up of (a) at least one organic polyisocyanate, (b) at least one reaction product of a sulfonyl isocyanate and an organic tin catalyst, which reaction product is present as solution in the polyisocyanate preparation, and optionally, (c) known auxiliary agents and additives used in polyurethane chemistry.

Component (b) is a reaction product of a sulfonyl isocyanate with an organic compound containing at least one tin-oxygen bond. However, pure addition products of a sulfonyl isocyanate with a compound having a tin (II) or tin (IV) carboxylate structure which addition products were formed without the elimination of carbon dioxide are not reaction products useful as Component (b).

The invention also relates to a process for the production of such polyisocyanate preparations in which at least one sulfonyl isocyanate is reacted with at least one organic compound containing at least one tin-alkoxy, tin-siloxy, di-stannoxane and/or tincarboxylate group. In this process, the proportion of reactants is chosen to provide at least one isocyanatosulfonyl group of the sulfonyl isocyanate for each tin-oxygen bond.

The reaction of the sulfonyl isocyanate and the organic tin compound may be carried out either in the absence of polyisocyanate component (a) and followed by mixing of the reaction product with the polyisocyanate component (a) or it may be carried out in polyisocyanate component (a) or a proportion of polyisocyanate component (a) followed by admixture with the remainder of the polyisocyanate (a). An auxiliary solvent may optionally be used in either case.

The reaction of the isocyanate with compounds containing tin alkoxy and/or tin siloxy groups is carried out at temperatures below 100° C. The reaction of the isocyanate with compounds containing distannoxane groups is carried out at 20° to 120° C. with liberation of carbon dioxide. The reaction of the isocyanate with compounds containing tin carboxylate groups is carried out at 60°–160° C. with liberation of carbon dioxide.

The invention further relates to the use of the polyisocyanate preparations of the present invention as reactants for compounds containing isocyanate reactive hydrogen atoms for the production of polyurethane plastics.

The invention also relates to polyurethane catalysts which are the product obtained by the reaction of a sulfonyl isocyanate with an organic compound containing at least one tin carboxylate group with liberation of carbon dioxide and/or the product of addition of a sulfonyl isocyanate to an organic compound containing at least one tin siloxy group.

Polyisocyanate preparations similar to those of the present invention containing tin salts which are inactivated by sulfonyl isocyanate are described in German Offenlegungsschrift 3,326,566. The addition products described in this publication are obtained by the reaction of sulfonyl isocyanates with tin carboxylates at 0° to 80° C. without liberation of carbon dioxide. These addition products have a lower catalytic activity than the reversibly inactivated tin catalysts of the present invention because reactivation of these known inactivated tin catalysts is accompanied by reformation of the tin carboxylates used as starting material. In contrast, reactivation of the reversibly inactivated catalysts of the present invention by alcoholysis or hydrolysis produces catalysts believed to have the structure of tin alkoxides or tin hydroxides which have a far higher catalytic activity than the tin carboxylates. Another advantage of the inactivated catalysts of the present invention is that when they are reactivated, their high catalytic activity develops at the "correct" moment (i.e. when the polyisocyanate preparations according to the invention are brought together with the polyol component in the case of a two-component system or when atmospheric moisture required, for example, for hardening coatings comes into play in the case of a one-component system). Yet another advantage of the compositions of the present invention is that they are far more unstable than the known tin carboxylates. Consequently, they rapidly lose their catalytic activity after termination of the isocyanate polyaddition reaction and are then no longer able to impair the resistance of the polyurethanes to hydrolysis.

Component (a) of the preparations of the present invention is composed of at least one organic polyisocyanate, i.e. any compound or mixture of compounds containing at least two organically bound isocyanate groups per molecule. Such compounds include both low molecular weight polyisocyanates having a molecular weight below 400 and modification products of such low molecular weight polyisocyanates having a molecular weight, calculated from the functionality and the amount of functional groups present, of from 400 to 10,000, preferably from 600 to 8,000 and most preferably from 800 to 5,000. Suitable low molecular weight polyisocyanates include those corresponding to the formula:

$$Q(NCO)_n.$$

in which n represents 2–4 (preferably 2), and Q represents an aliphatic hydrocarbon group having 2–18 (preferably 6–10) carbon atoms, a cycloaliphatic hydrocarbon group having 4–15 (preferably 5–10) carbon atoms, an aromatic hydrocarbon group having 6–15 (preferably 6–13) carbon atoms, or an araliphatic hydrocarbon group having 8–15 (preferably 8 to 13) carbon atoms.

Examples of suitable low molecular weight polyisocyanates include hexamethylene diisocyanate, 1,12-dodecane diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethyl cyclohexane, 2,4- and 2,6-hexahydrotolylene diisocyanate and any mixtures of these isomers, hexahydro-1,3- and/or 1,4-phenylene diisocyanate, perhydro-2,4'- and/or 4,4'-diphenyl methane diisocyanate, 1,3- and 1,4-phenylene diisocyanate, 2,4- and 2,6-tolylene diisocyanate and any mixtures of these isomers, diphenyl methane-2,4'-and/or -4,4'-diisocyanate, naphthylene-1,5diisocyanate, triphenyl methane-4,4',4''-triisocyanate and polyphenyl-polymethylene polyisocyanates obtainable by aniline-formaldehyde condensation followed by phosgenation.

Suitable relatively high molecular weight polyisocyanates include modification products of such simple polyisocyanates (i.e. polyisocyanates containing, for example, isocyanurate, carbodiimide, urethane, allophanate, biuret or uretdione structural units). These may be obtained by known processes from the simple polyisocyanates represented by the above general formula mentioned as examples. Among the relatively high molecular weight, modified polyisocyanates useful in this invention, the prepolymers with urethane groups and isocyanate end groups known in polyurethane chemistry which have molecular weights in the range of 400 to 10,000, preferably 600 to 8,000 and most preferably 800 to 5,000 are of particular interest. These compounds may be prepared in known manner by the reaction of excess quantities of simple polyisocyanates of the kind exemplified above with organic compounds containing at least 2 isocyanate reactive groups, in particular organic polyhydroxyl compounds. Suitable polyhydroxyl compounds include both simple polyhydric alcohols such as ethylene glycol, trimethylol propane, propane-1,2-diol, di- and/or tripropylene glycol and butane-1,2-diol and, more particularly, relatively high molecular weight polyether polyols and/or polyester polyols of the kind known in polyurethane chemistry which have molecular weights from 600 to 8,000 (preferably 800 to 4,000) and contain at least 2 (generally 2–8, preferably 2–4) primary and/or secondary hydroxyl groups.

Isocyanate prepolymers obtained, for example, from low molecular weight polyisocyanates of the kind exemplified above and from the less preferred compounds containing isocyanate reactive groups (e.g. polythioether polyols, hydroxyl-containing polyacetals, polyhydroxy polycarbonates, hydroxyl-containing polyester amides or hydroxyl-containing copolymers of olefinically unsaturated compounds) may, of course, also be used.

The compounds given as examples in U.S. Pat. No. 4,218,543, column 7, line 29 to column 9, line 25 are examples of suitable compounds containing isocyanate reactive groups, in particular hydroxyl groups, for the preparation of isocyanate prepolymers.

In the preparation of the isocyanate prepolymers, compounds containing isocyanate reactive groups are reacted with simple polyisocyanates of the type exemplified above at an NCO/OH equivalent ratio above 1. The isocyanate prepolymers generally have an isocyanate content of 2.5 to 25 wt. %, preferably 6 to 20 wt. %. In the context of the present invention, the terms "isocyanate prepolymers" and "prepolymers containing isocyanate end groups" include both the reaction products as such and mixtures thereof with excess quantities of unreacted starting polyisocyanates which mixtures are often referred to as "semi-prepolymers".

Polyisocyanate components (a) which are particularly preferred in the present invention are the usual commercial polyisocyanates used in polyurethane chemistry. These include hexamethylene diisocyanate, 1-isocyanato-3,3,5-trimethyl5-isocyanatomethyl-cyclohexane (isophorone diisocyanate, abbreviated IPDI), 4,4'-diisocyanatodicyclohexyl methane, 2,4-diisocyanatotoluene, and commercial mixtures thereof with 2,6-diisocyanatotoluene, 4,4'-diisocyanatodiphenyl methane and mixtures thereof with the corresponding 2,4'- and 2,2'-isomers, polyisocyanate mixtures of the diphenyl methane series obtainable in known manner by the phosgenation of aniline/formaldehyde condensates, modification products of these commercial polyisocyanates containing biuret or isocyanurate groups, and in particular isocyanate prepolymers of the above-mentioned type based on these commercial polyisocyanates and on the exemplified simple polyols and/or polyether polyols and/or polyester polyols, and any mixtures of such polyisocyanates.

Component (b) of the polyisocyanate preparations of the present invention are reaction products of sulphonyl isocyanates with any organic compound having at least 1 tin-oxygen bond, i.e. in particular at least 1 tin-alkoxy, tin-siloxy, distannoxane and/or tin-carboxylate group.

The sulfonyl isocyanates used in the present invention may be any inorganic or organic compounds having at least 1 structural unit of the formula

—SO$_2$—NCO.

The sulfonyl isocyanates used are preferably organic sulfonyl isocyanates, especially those with aromatically bound isocyanatosulfonyl groups. Processes for the preparation of organic sulfonyl isocyanates of the type suitable for the present invention and their chemical behavior are summarized by H. Ulrich in Chem. Rev. 65, pages 369–376, 1965. The preparation of aryl sulfonyl isocyanates has also been described in U.S. Pat. Nos. 2,666,787 and 3,484,466. Both aliphatic and cycloaliphatic as well as aromatic mono and polysulfonyl isocyanates may be used in the practice of the present invention. The following are specific examples: methyl sulfonyl isocyanate, butyl sulfonyl isocyanate, cyclohexyl sulfonyl isocyanate, perfluorooctyl sulfonyl isocyanate, phenyl sulfonyl isocyanate, p-toluene sulfonyl isocyanate, benzyl sulfonyl isocyanate, p-chlorophenyl sulfonyl isocyanate, m-nitrophenyl sulfonyl isocyanate, 2,5-dimethyl-phenyl sulfonyl isocyanate, p-fluorophenyl sulfonyl isocyanate, 2,5-dichlorophenyl sulfonyl isocyanate, 3,4-dichlorophenyl sulfonyl isocyanate, p-bromophenyl sulfonyl isocyanate, p-methoxy phenyl sulfonyl isocyanate, p-nitrophenyl sulfonyl isocyanate and o-nitrophenyl sulfonyl isocyanate; m-phenylene disulfonyl diisocyanate, p-phenylene disulfonyl diisocyanate, 4-methyl-m-phenylene disulfonyl diisocyanate, 2-chloro-p-phenylene disulfonyl diisocyanate, 5-chloro-m-phenylene disulfonyl diisocyanate, 1,5-naphthylene disulfonyl diisocyanate, 3-nitro-p-phenylene disulfonyl diisocyanate, 4-methoxy-m-phenylene disulfonyl diisocyanate, 2,5-furandiyl-bis-(methylene sulfonyl)-diisocyanate, 4,4'-biphenylene-disulfonyl diisocyanate, 2,2'-dichloro-4,4'-biphenylylene-disulfonyl diisocyanate, 3,3'-dimethoxy-4,4'-biphenylylenedisulfonyl diisocyanate, (methylene-di-p-phenylene)disulfonyl diisocyanate, (methylene-di-3,3'-dimethoxy-p-phenylylene)-disulfonyl diisocyanate, (methylene3,3'-dimethyl-p-phenylylene)-disulfonyl diisocyanate and 2-methyl-p-phenylene-disulfonyl diisocyanate: sulfonyl isocyanates containing additional isocyanate groups, such as m-isocyanatophenyl-sulfonyl isocyanate, p-isocyanatophenyl-sulfonyl isocyanate, 3-isocyanato-p-tolyl-sulfonyl isocyanate, 5-isocyanato-o-tolyl-sulfonyl isocyanate, 3-isocyanato-4-methoxyphenyl-sulfonyl isocyanate, 4-isocyanato-3-chlorophenyl-sulfonyl isocyanate, 4'-isocyanato-4-biphenylyl-sulfonyl isocyanate, 4'-isocyanato-2,2'-dichloro-4-biphenylyl-sulfonyl isocyanate, 4'-isocyanato-3,3'-dimethoxy-4-biphenylyl-sulfonyl isocyanate, α-(p-isocyanatophenyl)-p-tolyl-sulfonyl isocyanate, α-(4-isocyanato3-methoxy phenyl)-2-methoxy-p-tolyl-sulfonyl isocyanate, α-(4-isocyanato-m-tolyl)-2,4-xylylsulfonyl isocyanate and 5-isocyanato-1 naphthylsulfonyl isocyanate; and sulfonyl isocyanates containing free isothiocyanate groups, such as p-isothiocyanatophenyl-sulfonyl isocyanate, m-isothiocyanatophenyl-sulfonyl isocyanate, 3-isothiocyanato-4-methoxyphenyl-sulfonyl isocyanate and 4-isothiocyanato-3-methylphenyl-sulfonyl isocyanate.

It is preferred to use sulfonyl isocyanates in which the —SO$_2$—NCO— group is directly attached to an aromatic group. Phenyl-sulfonyl isocyanate, p-chlorophenyl-sulfonyl isocyanate and p-toluene-sulfonyl isocyanate (tosyl isocyanate) are particularly preferred. It is also in many cases advisable to use sulfonyl isocyanates of the type exemplified above which either have at least 2 isocyanatosulfonyl structural units or which have isocyanate groups in addition to those present in an isocyanatosulfonyl structural unit because such polyfunctional compounds can be built into a polyurethane structure without chain breaking when the polyisocyanate preparations are used, for example in combination with organic polyhydroxyl compounds to produce polyurethanes.

The sulfonyl isocyanates suitable for the present invention include not only the organic sulfonyl isocyanates exemplified above but also inorganic sulfonyl isocyanates, e.g. chlorosulfonyl isocyanate or sulfonyl diisocyanate, the preparation of which has been described e.g. in DE-PS 928,896 and in DE-PS 1,152,023 and trimethyl silyloxy-sulfonyl isocyanate.

Mixtures of different sulfonyl isocyanates of the type exemplified above could in principle also be used.

The organic tin compounds used in the present invention may be any organic compound having at least one tin-oxygen bond, particularly organic compounds having at least one tin-alkoxy, tin-siloxy, distannoxane and/or tin-carboxylate group. The tin compounds generally have a molecular weight in the region of 150 to 1,000.

The tin compounds suitable for this purpose include: tin(II) and tin(IV) salts of carboxylic acids such as tin-(II) acetate, tin(II) octoate, tin(II) ethylhexoate, tin(II) oleate, tin(II) laurate, dibutyl tin diacetate, dibutyl tin dilaurate, dibutyl tin maleate, dioctyl tin diacetate, dibutyl tin di-2-ethyl hexoate, tributyl tin acetate and triphenyl tin acetate: tin(IV) alkoxides such as tributyl tin methoxide, tributyl tin ethoxide, dibutyl tin dimethoxide, dibutyl tin diethoxide and dibutyl tin dibutoxide; distannoxanes such as hexabutyl distannoxane (bis(tri-n-butyl tin)-oxide), distannoxanes containing alkoxy or carboxy substituents, e.g. tetrabutyl-1,3-diethoxy-distannoxane, tetrabutyl-1,3-dimethoxy distannoxane and tetrabutyl-1,3-diacetoxydistannoxane; and stannosiloxanes as described, for example, in DE-AS 1,099,743, DE-AS 1,111,378 and EP-A-084, e.g. dibutyl tin-di-(trimethyl silyloxide), tetrabutyl-1,3-di-(trimethyl silyloxy)-distannoxane, tetra-(dibutyl-acetoxy tin oxy)-silane and tetrabutyl3-ethoxy-1-(triethoxy siloxy)-distannoxane.

The auxiliary agents and additives optionally present in the polyisocyanate preparations of the invention are of the type known to those skilled in polyurethane chemistry.

For example, the polyisocyanate preparations of the present invention may contain organic blowing agents of the kind frequently used for the production of polyurethane foams, such as methylene chloride, chloroform, ethylidene chloride, vinylidene chloride, monofluorotrichloromethane, chlorodifluoromethane, dichlorodifluoromethane, butane, hexane, heptane or diethyl ether. Mold release agents which do not react with isocyanate groups, such as those used for the production of self-releasing molded plastics based on polyurethanes, may also be used. The preferred additives, however, include those used in the adhesives and lacquers technology such as solvents. Examples of appropriate solvents are: toluene, xylene, ethyl acetate, butyl acetate, methylethyl ketone, methyl isobutyl ketone, ethylene glycol-monomethyl ether acetate, ethylene glycol-monoethyl ether acetate and any mixtures of such solvents. These solvents are used especially when the polyisocyanate preparations based on isocyanate prepolymers are used as one component adhesives or lacquers which are self-hardening under the influence of atmospheric moisture. Other auxiliary agents and additives known in lacquer technology such as pigments, fillers, levelling agents and the like may also be incorporated with the polyisocyanate preparations.

The polyisocyanate preparations of the present invention may be made by any one of the processes described below. In each of these processes, however, the sulfonyl isocyanate and tin compounds are reacted together in proportions such that at least one isocyanato sulfonyl group of the sulfonyl isocyanate is provided for each tin-oxygen example structural units of the formula —Sn—O—Sn—(two tin-oxygen bonds) are present, then at least two equivalents of isocyanato sulfonyl groups must be used. It will readily be seen that the use of less than an equivalent amount of sulfonyl isocyanate is not advisable because it would lead to only partial blocking of the catalysts. The use of an excess of sulfonyl isocyanate is generally not harmful and may in some cases reduce the sensitivity to moisture (absorption of traces of moisture by the sulfonyl isocyanate excess) of the reaction products. The proportion of reactants is therefore generally chosen to provide 1 to 3, preferably 1 to 2 isocyanato sulfonyl groups from the sulfonyl isocyanate for each tin-oxygen bond.

The reaction according to the invention is based on a general principle that the isocyanato sulfonyl group is inserted in each tin-oxygen bond present:

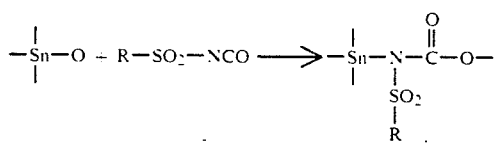

so that decarboxylation reactions may occur, depending upon the structure of the tin compounds.

The process of the invention is carried out as described below. The details depend upon the particular tin salt(s) being used. The structures given below for the addition compounds of this invention were in some cases taken directly from the literature or derived from analogous reactions disclosed in the literature. See, for example, the following literature references:

A. J. Bloodworth and A. G. Davies, J. Chem. Soc. (1965), 5238;

A. J. Bloodworth and A. G. Davies, J. Chem. Soc. (1965), 6245;

A. J. Bloodworth and A. G. Davies, J. Chem. Soc. (1965), 6858;

W. P. Neumann et al, Angew. Chem. 76, 856 (1964);

Y. I. Dergunov, N. I. Mysin and G. P. Balabanov, Zh. Obshch. Khim. 42 (104) 9, 2034 (1972);

N. I. Mysin and Y. I. Dergunov, Zh. Obshch. Khim. 46 (108) 1, 153 (1976);

G. P. Balabonov, Y. I. Dergunov, Y. I. Mushkin and N. I. Mysin, Zh. Obshch. Khim. 42 (104) 3, 627 (1972);

N. I. Mysin and Y. I. Dergunov, Zh. Obshch, Khim. 44. 1520 (1974) and

Y. I. Dergunov, N. Y. Mysin and Y. I. Mushkin, Zh. Obshch Khim. 44, 813 (1974).

Solvent free preparation of the latent tin catalysts.

The tin compound is introduced into a suitable stirrer vessel under inert conditions and the sulfonyl isocyanate is added at the temperature indicated. The reaction mixture is then stirred until, for example, the theoretical quantity of $CO_2$ has been evolved (control by weighing or gas meter) or until a quantitative reaction has been obtained.

If 1 mol of a tin(IV) carboxylate such as dibutyl tin dilaurate and 2 mol or more of tosyl isocyanate are used, a stannilated N-acyltosylamide is obtained at 60° to 160° C. (preferably above 80° C. and in particular at temperatures above 80° C. and up to 120° C.) with liberation of 2 mol of carbon dioxide. This reaction is represented by the following equations.

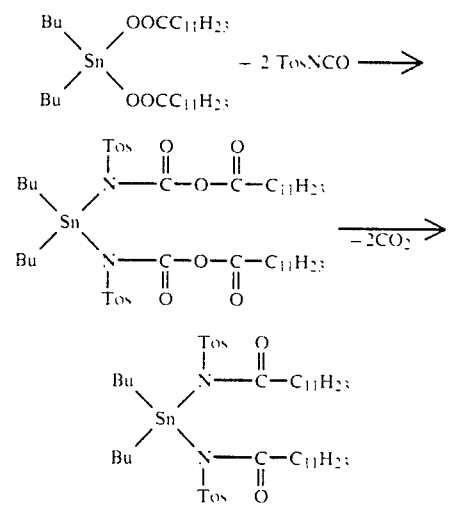

If 1 mol of a tin(IV) monoalkoxide such as tributyl tin methoxide and 1 mol or more of tosyl isocyanate are used, a stannylated tosyl urethane is obtained spontaneously with slight evolution of heat (without liberation of carbon dioxide) even at room temperature or at any temperature below 100° C. (preferably at 20° to 60° C.). This reaction is represented by the following equation:

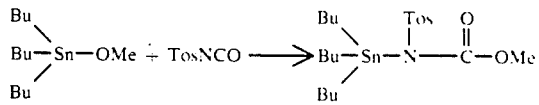

If 1 mol of a distannoxane such as hexabutyl distannoxane and 2 mol or more of tosyl isocyanate are used, a bis-stannylated tosyl urea is formed at 20° to 120° C. (preferably at 60° to 100° C.) with liberation of 1 mol of carbon dioxide. This reaction is represented by the following equation.

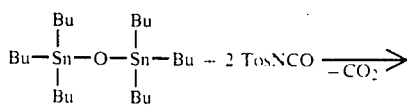

-continued

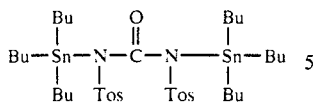

If the reactants used are 1 mol of a substituted distannoxane containing e.g. tin-acetoxy groups, such as 1,3-diacetoxy tetrabutyl distannoxane, and 4 mol or more of tosyl isocyanate, a product having a tosyl urea linked to 2 N-acyltosylamides through dibutyl stannyl units is obtained at 60° to 120° C. (preferably 80° to 120°) with liberation of 3 mol of carbon dioxide. This reaction is represented by the following equation:

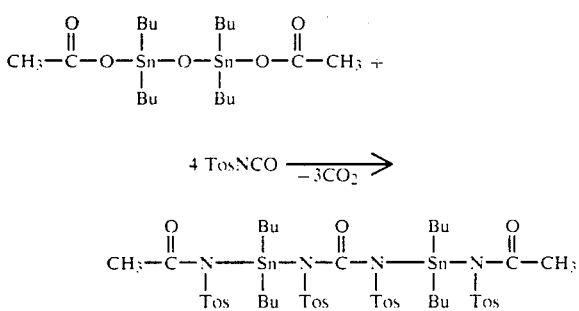

If 1 mol of a stannosiloxane such as dibutyl tin di-(trimethyl silyloxide) and 2 or more mol of tosylisocyanate are used, a N,N'-stannyl-bis-tosylurethane is formed spontaneously even at room temperature or any temperature below 100° C. (preferably not higher than 60° C.) in accordance with the following equation.

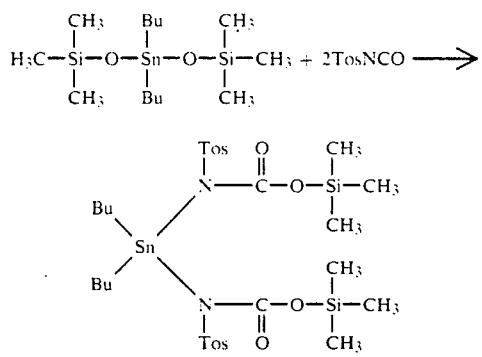

The stannosiloxanes may in addition contain other functional reactive groups. For example, tetrabutyl-3-ethoxy-1-(triethoxysiloxy)-distannoxane reacts with 4 or more mol of tosyl isocyanate at temperatures in the range of 20° to 100° C. (preferably at 60° to 100° C.) to release 1 mol of carbon dioxide and yield a product in which a tosyl urea is linked to 2 differently substituted tosyl urethanes by way of dibutyl stannyl units. This reaction is represented by the following equation:

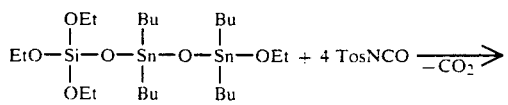

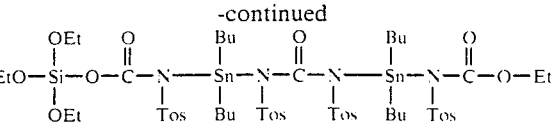

The reaction of sulfonyl isocyanate with compounds containing tin alkoxy or tin siloxy groups takes place at temperatures below 100° C., preferably at 20° to 60° C. The sulfonyl isocyanate reacts with compounds containing distannoxane groups at 20° to 120° C., preferably at 60° to 100° C., and with compounds containing tin carboxylate groups at 60° to 160° C., preferably at 80° to 120° C. If several different tin groups are present at the same time, the reaction is preferably carried out at a temperature which satisfies each of these conditions for the specific groups present. Thus, the reaction of sulfonyl isocyanate with the tetrabutyl-3-ethoxy-1-(triethoxy siloxy)-distannoxane preferably takes place at a temperature in the region of 60° to 100° C.

Formulation of the latent tin catalysts in polyurethane systems containing isocyanate groups.

The reaction of sulfonyl isocyanate with tin compound may be carried out in a suitable inert solvent such as one of those already mentioned above or in one of the above-mentioned organic liquids used as blowing agents or it may be carried out solvent free. The reaction product, optionally in the form of a solution, may thereafter be mixed with the polyisocyanate component (a). Any solvent used may be removed by distillation either before or after the reaction product is mixed with the polyisocyanate. The reaction may also be carried out in polyisocyanate component (a) or in a proportion of polyisocyanate component (a). In the latter case, the reaction product is then mixed with the remaining quantity of polyisocyanate component. An auxiliary solvent may also be used at this stage if desired and may subsequently be removed by distillation after the individual components have been mixed together. The reaction may also be carried out in one particular organic polyisocyanate (fractional portion of component (a)) and another organic polyisocyanate of the type exemplified above may then be incorporated in the resulting mixture in which case polyisocyanate component (a) is composed of the total quantity of 2 different polyisocyanates.

If the polyisocyanate preparations are produced simply by mixing the components, it is only necessary to ensure that atmospheric moisture is excluded. The components can easily be mixed because the latent tin catalysts of the present invention are readily soluble in organic polyisocyanates and solvents. Heating is not necessary but may be carried out if desired to lower the viscosity.

In all variations of the process according to the invention, polyisocyanate component (a) and the individual components of (b) (i.e. sulfonyl isocyanate and organic tin catalyst) are preferably put into the process in quantities such that the polyisocyanate preparations contain 0.005 to 10 wt. %, preferably 0.01 to 5 wt. % of tin, based on polyisocyanate component (a).

The auxiliary agents and additives optionally used in the polyisocyanate preparations of the present invention are generally added after preparation of solutions of component (b) (the reaction product of sulfonyl isocyanate and organic tin catalyst) in polyisocyanate component (a) although in principle it would also be possible to incorporate auxiliary agents and additives with component (a) before the reaction according to the invention is carried out and before components (a) and (b) are mixed.

The addition compounds of the present invention are extremely sensitive to hydrolysis and alcoholysis and are decomposed by the presence of water (moisture in the substrate or in the atmosphere) and/or compounds containing isocyanate reactive groups, in particular hydroxyl groups, with release of the catalysts. Before this hydrolytic or alcoholytic decomposition of the addition compounds according to the invention takes place, these compounds are completely inert towards isocyanate groups and give rise to no side reactions which would impair the storage stability of organic polyisocyanates. The polyisocyanate preparations according to the invention are therefore highly interesting starting materials containing masked catalysts for the production of polyurethanes and may be used for the production of any polyurethane products, e.g. foams, elastomers, coatings or adhesives. The polyisocyanate preparations of the invention may be cured both on the principle of one-component systems and on the principle of 2-component systems with compounds containing isocyanate reactive groups. In the former case, water (substrate moisture or atmospheric moisture) generally constitutes the "compound containing isocyanate reactive groups". If the polyisocyanate preparations are used on the basis of the 2-component principle, the known compounds from polyurethane chemistry containing isocyanate reactive groups, in particular hydroxyl groups, examples of which have been given above in the description of the preparation of isocyanate prepolymers, as well as any conventional auxiliary agents and additives of polyurethane chemistry may be used. The polyisocyanate preparations of the present invention are used instead of the conventional polyisocyanate components. The polyisocyanate preparations of the present invention are of special interest for one component systems which can be cross linked by atmospheric moisture, such as those used as adhesives or as surface coatings. The polyisocyanate preparations of the invention are stable in storage in the absence of moisture but when brought into contact with atmospheric moisture, they harden virtually as rapidly as the corresponding systems known in the art which contain unmasked catalysts.

When preparing the polyisocyanate preparations of the present invention containing auxiliary agents and additives (in particular, solvents and/or pigments or fillers) this stability in storage may be secured by using an excess of sulfonyl isocyanate ("water absorbent") (see U.S. Pat. Nos. 3,330,849 and 3,479,325).

All percentages and parts given in the following examples are percentages and parts by weight.

EXAMPLES

Abbreviations used:

TABLE 1

| | |
|---|---|
| DBTL: | dibutyl tin dilaurate |
| DTBD: | 1,3-diacetoxy-tetrabutyl-distannoxane |
| HBDS: | hexabutyl distannoxane |
| Crude MDI: | 4,4'-diisocyanatodiphenyl methane mixed with its isomers and higher homologs. NCO content = 30.4%; viscosity (25° C.) = 80 mPas |
| RT: | ambient temperature (18-25°C.) |

TABLE 1-continued

| | |
|---|---|
| SO: | tin dioctoate |
| TBTM: | tributyl tin methoxide |
| TDI 80: | mixture of 80% of 2,4- and 20% of 2,6-diisocyanatotoluene |
| TETD: | tetrabutyl-3-ethoxy-1-(triethoxy siloxy) distannoxane |
| TosNCO: | p-toluene sulfonyl isocyanate |
| IR spectra: | s = strong absorption band |
| | m = medium absorption band |
| | w = weak absorption bank |

General method of preparation of the reaction products according to the invention (Examples 1 to 11)

The tin compound was introduced into a calibrated 2-necked flask under anhydrous nitrogen. The given quantity of tosyl isocyanate was then added at the prescribed temperature either in a counter current of nitrogen or from a closed dropping funnel.

The reaction mixture was stirred at the temperature indicated and the evolution of $CO_2$ was checked by weighing. The end product was filled into containers under an atmosphere of nitrogen.

EXAMPLE 1

103.7 g of a reddish yellow, oily liquid were obtained from 50 g (0.079 mol) DBTL and 62.3 g (0.316 mol) of TosNCO (addition at RT, no exothermic reaction) after 4 hours stirring at 100° C. ($CO_2$ quantity: 0.195 mol).

2.07 g of this product corresponded to 1.0 g of DBTL (overstabilization 2 mol of TosNCO per mol of DBTL).

EXAMPLE 2

105.3 g of a reddish yellow oil were obtained from 50.0 g (0.079 mol) of DBTL and 62.4 g (0.317 mol) of TosNCO when the mixture was stirred for 2 hours 15 minutes at 120° C. (quantity of $CO_2$: 0.16 mol).

IR spectrum: 2240 cm$^{-1}$(s)(overstabilization with 2 mol of TosNCO per mol of DBTL)

1730 cm$^{-1}$ (m)

2.10 g of this product corresponded to 1.0 g of DBTL.

EXAMPLE 3

75.8 g of product were obtained by stirring 50.0 g (0.079 mol) of DBTL and 31.2 g (0.158 mol) of TosNCO for 2 hours 30 minutes at 120° C. (quantity of $CO_2$: 0.12 mol).

When the reaction was equimolar, the evolution of $CO_2$ was not quantitative.

EXAMPLE 4

62.9 g of a yellowish resin were obtained from 22.1 g (0.069 mol) of TBTM and 40.8 g (0.207 mol) of Tosyl isocyanate (exothermic reaction up to 70° C. on addition of components) when the reaction mixture was stirred for 30 minutes at 80° C. (quantity of $CO_2$ : no decarboxylation).

2.85 g of this product corresponded to 1.0 g of TBTM (overstabilization with 2 mol of TosNCO per mol of TBTM).

EXAMPLE 5

87.4 g of a yellowish solid substance were obtained from 50.0 g (0.084 mol) of HBDS and 41.4 g (0.210 mol) of Tosyl isocyanate (components added together at 80° C., 3 to 5 minutes, vigorous evolution of gas, slightly exothermic) when the components were stirred for 60 minutes at 80° C. (quantity of $CO_2$:0.09 mol); IR spectrum: 1690 cm$^{-1}$ (s).

1.75 g of this product corresponded to 1.0 g of HBDS (overstabilization with 0.5 mol of TosNCO per mol of HBDS).

EXAMPLE 6

1.4 g (0.007 mol) of TosNCO (IR: 1750 cm$^{-1}$, weak band) were added at RT to 5.0 g (0.007 mol) of TETD (IR: no absorption between 1650 and 1800 cm$^{-1}$) dissolved in 25 mol of absolute toluene. The reaction mixture was stirred for 10 minutes, and a further 2.8 g (0.014 mol) of TosNCO were then added (IR: 1730 cm$^{-1}$ (m); 1750 cm$^{-1}$ (w)).

The solution heated up to 38° C. 1.4 g (0.007 mol) of TosNCO (IR: 1730 cm$^{-1}$ (m); 1750 cm$^{-1}$ (s)) were again added after 10 minutes and a further 1.4 g (0.007 mol) of TosNCO (IR: 2240 cm$^{-1}$ (s), 1750 cm$^{-1}$ (s) and 1730 cm$^{-1}$ (m)) were added after another 10 minutes.

Interpretation of the IR spectra showed that 4 mol of TosNCO were directly inserted per mol of TETD (the fifth mol of TosNCO showed free isocyanate bands). No marked evolution of gas was observed at RT. When the experiment was repeated at 80° C., spontaneous evolution of gas took place on addition of the first 1.4 g of TosNCO.

EXAMPLE 7

When 25.0 g (0.035 mol) of TETD and 56.0 g (0.284 mol) of Tosyl isocyanate (added together at 80° C., 5 minutes, slightly exothermic reaction) was stirred together at 80° C. for 60 minutes, 79.7 g of an oily yellow liquid were obtained (quantity of $CO_2$:0.03 mol): IR spectrum: strong band at 1750 cm$^{-1}$ with shoulder at 1730 cm$^{-1}$; 2240 cm$^{-1}$ (s).

3.2 g of product corresponded to 1.0 g of TETD (overstabilization with 4 mol of TosNCO per mol of TETD).

EXAMPLE 8

10.5 g of the reddish oil from Example 2 were introduced into about 30 ml of absolute butyl acetate. The mixture was stirred at RT for 15 minutes and then made up to exactly 50 ml with absolute butyl acetate.

1 ml of this solution corresponded to 0.1 g of DBTL.

EXAMPLE 9

89.9 g of a yellow, pasty solid product were obtained from 50.0 g (0.123 mol) of SO and 48.7 g (0.247 mol) of Tosyl isocyanate (added together at RT, 30 minutes, slightly exothermic reaction) by 2 hours stirring at 80° C. and 2 hours stirring at 120° C. (quantity of $CO_2$: 0.2 mol).

1.8 g of the product corresponded to 1.0 g of SO.

EXAMPLE 10

50.0 g (0.083 mol) of DTBD and 131.3 g (0.664 mol) of Tosyl isocyanate in 175.0 g of absolute toluene (added together at 80° C., 2 to 3 minutes, vigorous evolution of gas) were boiled under reflux for 8 hours (110° C.) and the toluene was drawn off to yield 170.3 g of a yellow solid (quantity of $CO_2$: 0.25 mol); IR spectrum: 1725 cm$^{-1}$ (m); 1700 cm$^{-1}$ (w, shoulder).

3.4 g of this product corresponded to 1.0 g of DTBD (overstabilization with 4 mol of TosNCO per mol of DTBD).

Polyisocyanate preparations according to the invention (Examples 12, 13, 15, 17, 19, 21, 22 and 23) and Comparative preparations (Examples 11, 14, 16, 18 and 20)

Polyisocyanate preparations according to the invention and corresponding comparison substances were prepared in 14 parallel experiments by mixing TDI 80 and crude MDI under inert gas with the tin compounds indicated in Tables 1 and 2 below. The quantity of tin compounds put into the process was calculated in each case to provide one part of the tin compound to 100 parts of the polyisocyanate, not counting the sulfonyl isocyanate. In Examples 11 to 21, the preparations obtained were first stored at room temperature for 24 hours and then mixed with a polyether polyol of OH number 380 (propoxylation product of trimethylol propane) at room temperature, observing an NCO/OH equivalent ratio of 1:1. The gel time (solidification point) $t_{VQ}$, rise in temperature $T_{VQ}$, maximum temperature $T_{MAX}$ and time required to reach the maximum temperature $t_M$ were recorded Examples 22 to 24 describe analogous experiments but in these experiments the polyisocyanate preparations containing the catalysts according to the invention were stored at room temperature for 8 months after they had been prepared.

The remaining quantities of polyisocyanate preparations according to Examples 12 to 22 were kept in closed containers at room temperature. The time that elapsed before visible changes appeared (crystallization, cloudiness or formation of precipitates) is referred to as the shelf life and is also entered in Table 1. Recording of the shelf life was stopped after 6 months.

TABLE 1

Polyisocyanate preparation in TDI 80 after a storage time of 24 hours.

| Example | Tin Compound | Shelf life | $t_{VQ}$ | $T_{VQ}$ | $t_M$ | $T_{MAX}$ |
|---|---|---|---|---|---|---|
| 11 | DBTL | 1 d | 50" | 65° | 115" | 115° |
| 12 | according to Ex 3 | — | 33" | 55° | 120" | 122° |
| 13 | according to Ex 2 | — | 33" | 55° | 105" | 115° |
| 14 | HBDS | 2 d | 405" | 85° | 450" | 116° |
| 15 | according to Ex 5 | — | 180" | 60° | 275" | 109° |
| 16 | DTBD | 1 d | 10" | 35° | 145" | 110° |
| 17 | according to Ex 10 | — | 13" | 40° | 115" | 120° |
| 18 | TETD | 8 d | 50" | 55° | 140" | 114° |
| 19 | according to Ex 7 | — | 25" | 40° | 110" | 120° |
| 20 | SO | 17 d | 10" | 30° | 170" | 97° |
| 21 | according to Ex 9 | — | 7" | 30° | 145" | 155° |

Legend to Table 1:
d = days
— = no change after 6 months
" = seconds

TABLE 2

Polyisocyanate preparations after 8 months storage time

| Example | Isocyanate | Masked catalyst | Gelling Test | | | |
|---|---|---|---|---|---|---|
| | | | $t_{VQ}$ | $T_{VQ}$ | $t_M$ | $T_{MAX}$ |
| 22 | TDI 80 | according to Ex 3 | 55" | nd* | 143" | 140° |
| 23 | Crude MDI | according | 20" | nd | 190" | 113° |

TABLE 2-continued

| | | Polyisocyanate preparations after 8 months storage time | | | | |
|---|---|---|---|---|---|---|
| Example | Isocyanate | Masked catalyst | $t_{TQ}$ | Gelling Test $T_{TQ}$ $t_{TM}$ | | $T_{MIX}$ |
| | | to Ex 3 | | | | |

Legend to Table 2:
d = days
* = not determined
** = seconds.

Polyisocyanate preparations according to the invention based on an isocyanate prepolymer (Examples 25, 26 and 28) and corresponding comparative preparations (Examples 24 to 27)

The isocyanate prepolymer used in the following examples was a reaction product of crude MDI and a polypropylene glycol with OH number 56, and had an isocyanate content of 12.4% and a viscosity (25° C.) of 7500 mPa.s.

Polyisocyanate preparations according to the invention and the corresponding comparative substances were prepared by mixing 100 g of the given isocyanate prepolymer with the tin compound mentioned in Table 3. The polyisocyanate preparations obtained had the shelf life values at RT and at 50° C. shown in Table 3.

TABLE 3

| | Preactivated aromatic isocyanate prepolymer | | | |
|---|---|---|---|---|
| Example | Tin Compound | Concentration (%) | Shelf life RT (Days) | 50° C. |
| 24 | DBTL | 1 | 38 | 8 |
| 25 | according to Ex 2 | 1 | 104 | 34 |
| 26 | according to Ex 2(a) | 1 | >270 | not determined |
| 27 | TETD | 0.5 | 5 | — |
| 28 | according to Ex 8 | 0.5 | >180d | — |

Legend to Table 3:
(CH₃)₃Si—O—SO₂—NCO was used instead of the equivalent quantity of TosNCO
(b) based on tin compound without sulfonyl isocyanate.

To test the adhesive properties of the polyisocyanate preparations described in Table 3, test samples of glass fiber reinforced polyester resin (glass content 30%) measuring 2×4×0.3 cm were lightly rubbed down with sandpaper and held over boiling water for about 2 seconds. Four parallel experiments were then carried out in which the surfaces of the test samples were coated with the polyisocyanate preparations of Examples 24, 25, 27 and 28 to form a layer about 0.2 to 0.4 mm in thickness and the samples were placed together to leave an overlapping area of 2 cm².

The samples were then pressed together under a pressure of 0.3 MP. The shear strength was determined according to DIN 53 283 at a spindle feed rate of 100 mm/min after the times shown in Table 4.

TABLE 4

| | Shear Strength in N/mm² | | | |
|---|---|---|---|---|
| Example | 15 min | 30 min | 60 min | 240 min |
| 24 | 3.1 | 7.0 | 8.2 | 9.6(a) |
| 25 | 3.4 | 7.5 | 8.5 | 10.0(a) |
| 27 | 2.1 | 2.2 | 6.9 | 9.8(a) |

TABLE 4-continued

| | Shear Strength in N/mm² | | | |
|---|---|---|---|---|
| Example | 15 min | 30 min | 60 min | 240 min |
| 28 | 3.0 | 3.3 | 7.0 | 10.2(a) |

Legend to Table 4:
(a) with delamination.

Polyisocyanate preparations according to the invention based on an aliphatic isocyanate prepolymer (Examples 31, 32, 33 and 35) and comparative preparations (Examples 29, 30 and 34)

In the following examples, a 60% solution of an aliphatic isocyanate prepolymer in ethyl glycol acetate/xylene (4:1) having an isocyanate content of 9.5% (of the solution) was used. The isocyanate prepolymer had been prepared by the reaction of (i) a biuret polyisocyanate based on hexamethylene diisocyanate having an isocyanate content of 22% with (ii) a hydroxyl-containing polyester polyol (OH number 66) of phthalic acid anhydride and trimethylol propane.

In 6 parallel experiments (Examples 30–35), the prepolymer solution was mixed in each case with 1.0% of the tin compound mentioned in Table 5. This quantity refers to the weight of the tin compound, not including the sulfonyl isocyanate, and to the solids content of the solution. Films having a thickness of 0.15 mm when wet were formed on glass plates and dried at 29° C. and 50% relative humidity. The pendulum damping by König's test and the conditions required for drying until firm to the touch were then determined (Examples 30–35). Example 29 is a comparison example without catalyst. The results are summarized in Table 5.

TABLE 5

| | | Pendulum damping (s) after | | | | Touch firm |
|---|---|---|---|---|---|---|
| Example | Catalyst Used | 8 h | 24 h | 3 d | 7 d | drying |
| 29 | Uncatalyzed | — | — | — | — | >24 h |
| 30 | DBTL | 28 | 123 | 134 | 140 | 330 min |
| 31 | according to Ex 2 | 24 | 115 | 123 | 144 | 375 min |
| 32 | according to Ex 6 | 27 | 101 | 115 | 143 | 280 min |
| 33 | according to Ex 7 | 43 | 143 | 155 | 165 | 290 min |
| 34 | HDBS | 83 | 119 | 125 | 125 | 110 min |
| 35 | according to Ex 5 | 64 | 97 | 104 | 108 | 130 min |

EXAMPLE 36

210 g of masked tin catalyst according to the invention from Example 2 were dissolved in 790 g of TDI 80. A storage stable solution of the tin catalyst in the diisocyanate was obtained. This solution showed no signs of cloudiness when stored for over 6 months with exclusion of moisture.

A comparison experiment in which only 0.1 part by weight of DBTL was dissolved in TDI 80 without first being masked according to the invention formed crystalline precipitates after only 1 day's storage at RT.

Cold foam

Two-component systems (isocyanate + formulated polyol) are normally used in production plants for producing cold molded foam. The addition of tin activators such as DBTL has the disadvantage that the polyol formulation must always be freshly prepared for rapid use due to instability in storage or else some means of fresh addition must be installed. These disadvantages are eliminated when DBTL is replaced by the products of the present invention because these products can be formulated to remain stable in the polyisocyanate mixture. Compared with the zero values, comparable foam qualities are obtained with a simplified technique.

Example of a cold foam formulation (laboratory foam)

The following starting materials were mixed to produce a foam.

Polyether A

Dispersion of a reaction product of equimolar quantities of TDI 80 and hydrazine in a polyether polyol having a molecular weight of 4800 prepared by the propoxylation of trimethylol propane followed by ethoxylation of the propoxylation product (PO:EO ratio by weight=83:17), solids content of the dispersion: 20%, OH number of the dispersion: 28.

Polyether B

Polyether polyol, molecular weight 6000, prepared by the propoxylation of trimethylol propane followed by ethoxylation of the propoxylation product (ratio by weight PO:EO=83:17).

Stabilizer

Commercial polysiloxane stabilizer of Bayer AG Leverkusen ("Stabilizer KS 43").

Polyisocyanate mixture

Mixture of TDI 80 and crude MDI in proportions by weight of 80:20, isocyanate content: 44.5%.

The figures given in Table 6 are parts by weight.

TABLE 6

|  | Comparison | According to the Invention |
|---|---|---|
| Polyether A | 50 | 50 |
| Polyether B | 50 | 50 |
| Water | 3 | 3 |
| Diazabicyclo-(2.2.2)-octane | 0.2 | 0.2 |
| N-methylmorpholine | 0.4 | 0.4 |
| bis-(dimethylaminoethyl)-ether | 0.1 | 0.1 |
| stabilizer | 0.8 | 0.8 |
| DBTL | 0.02 | — |
| catalyst from Example 2 | — | 0.042 |
| polyisocyanate mixture | 36.7 | 36.3 |
| Cream time (s) | 5 | 6 |
| Rise time (s) | 83 | 95 |
| Gel time (s) | 51 | 56 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate preparation comprising
   (a) at least one organic polyisocyanate and
   (b) at least one reaction product of a sulfonyl isocyanate and an organic tin catalyst having at least one tin-oxygen bond, wherein said organic tin catalyst is an organic compound in which each said tin-oxygen bond is present in a structural unit selected from a tin-alkoxy group, a tin-siloxy group, or a distannoxane group.

2. The polyisocyanate preparation of claim 1 in which the organic tin catalyst is used in a quantity such that 0.005 to 10 wt. % of tin based on polyisocyanate (a) is present.

3. The polyisocyanate preparation of claim 1 in which the sulfonyl isocyanate contains at least one aromatically bound isocyanato-sulfonyl group.

4. The polyisocyanate preparation of claim 1 which further comprises auxiliary agents and/or additives.

5. A process for the production of the polyisocyanate preparation of claim 1 in which a sulfonyl isocyanate is reacted with an organic tin compound containing at least one tin-oxygen bond in quantities such that at least one isocyanatosulfonyl group is present for each tin-oxygen bond to form a reaction product, which reaction product is dissolved or dispersed in a polyisocyanate.

6. The process of claim 5 in which the reaction product of the sulfonyl isocyanate and the organic tin compound is formed in the presence of the polyisocyanate.

7. The process of claim 5 in which the reaction product of the sulfonyl isocyanate and the organic tin compound is formed in the presence of a portion of the polyisocyanate and the remaining polyisocyanate is subsequently added.

8. The process of claim 5 in which the reaction product of the sulfonyl isocyanate and the organic tin compound is formed in the absence of the polyisocyanate and the polyisocyanate is subsequently mixed with the reaction product.

9. The process of claim 5 in which the organic tin compound contains a tin-alkoxy and/or tin-siloxy group and the reaction of the sulfonyl isocyanate with the organic tin compound is carried out at a temperature below 100° C.

10. The process of claim 5 in which the organic tin compound contains a distannoxane group and the reaction of the sulfonyl isocyanate with the organic tin compound is carried out at 20° to 120° C. with liberation of carbon dioxide.

11. A polyisocyanate preparation according to claim 1 wherein the organic tin catalyst is an organic compound in which each tin-oxygen bond is a tin-alkoxy group.

12. A polyisocyanate preparation according to claim 2 wherein the organic tin catalyst is tributyl tin methoxide.

13. A polyisocyanate preparation according to claim 1 wherein the organic tin catalyst is an organic compound in which each tin-oxygen bond is a distannoxane group.

14. A polyisocyanate preparation according to claim 13 wherein the organic tin catalyst is hexabutyl distannoxane.

15. A polyisocyanate preparation according to claim 1 wherein the organic tin catalyst is an organic compound in which each tin-oxygen bond is a tin-siloxy group.

16. A polyisocyanate preparation according to claim 15 wherein the organic tin catalyst is dibutyl tin di(-trimethylsilyloxide).

17. A polyisocyanate preparation according to claim 15 wherein the organic tin catalyst is tetrabutyl-3-ethoxy-1-(triethoxysiloxy)distannoxane.

* * * * *